J. P. CLEAL.
CASH REGISTER.
APPLICATION FILED AUG. 6, 1903.
949,884.
Patented Feb. 22, 1910.
6 SHEETS—SHEET 1.
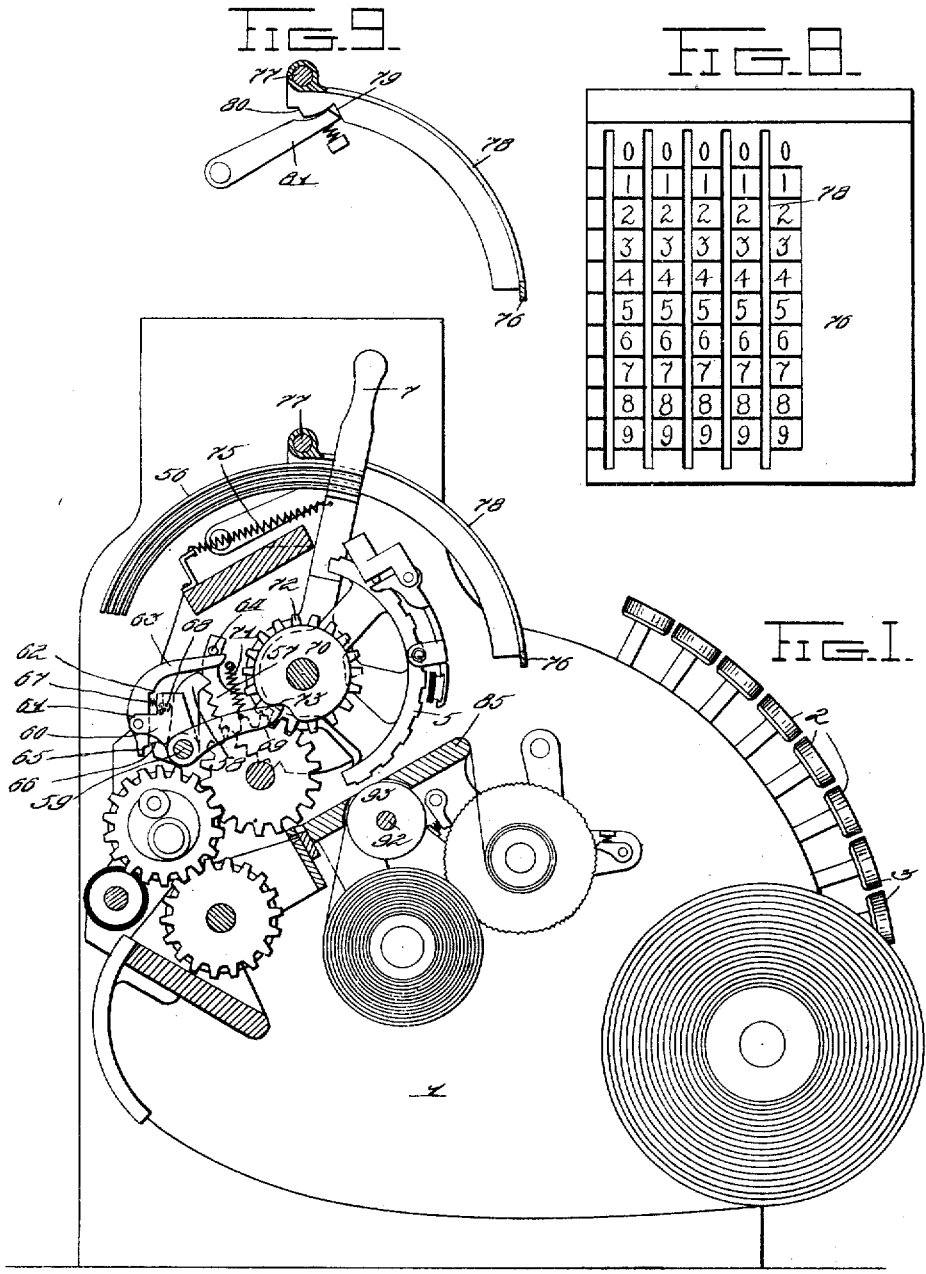

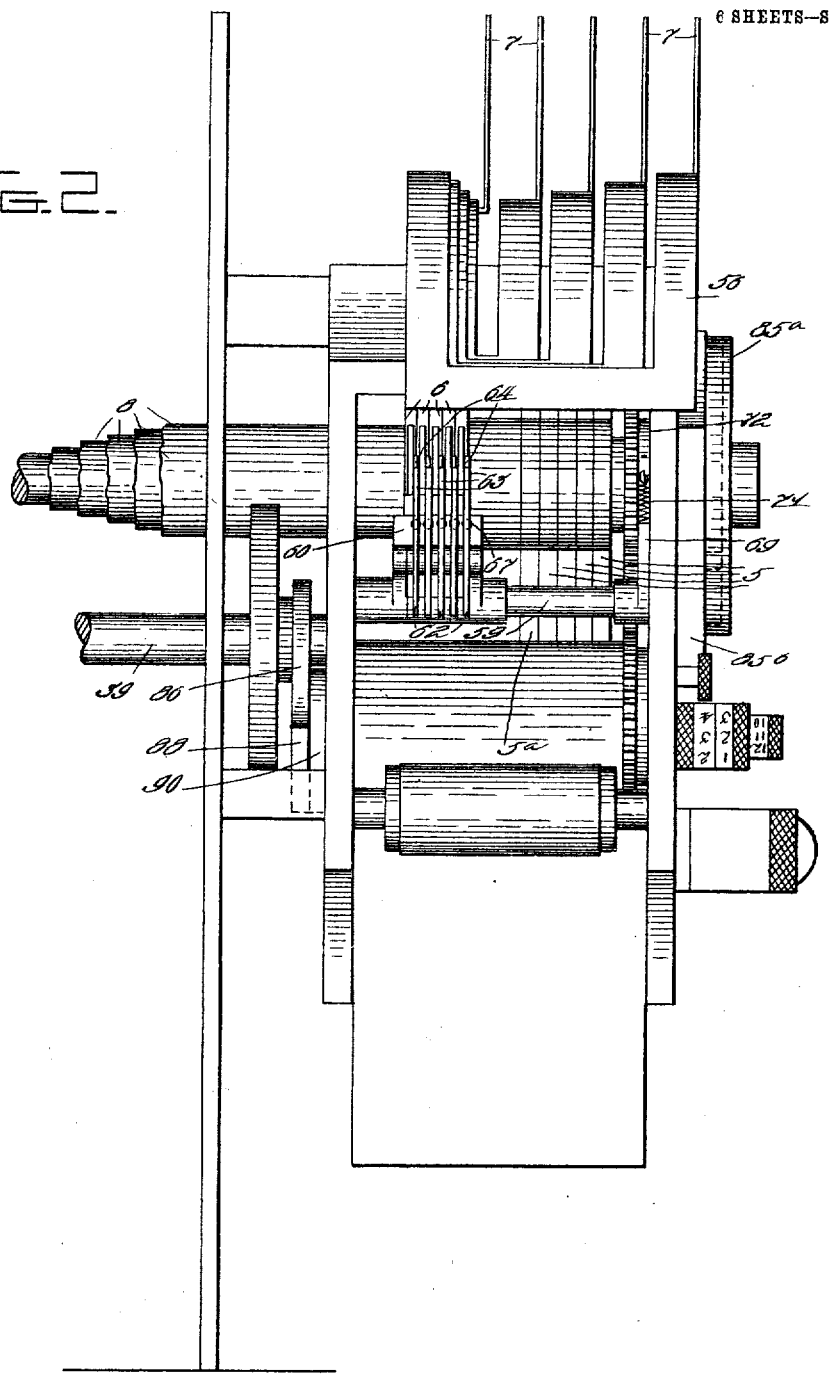

J. P. CLEAL.
CASH REGISTER.
APPLICATION FILED AUG. 6, 1903.
949,884.
Patented Feb. 22, 1910.
6 SHEETS—SHEET 3.
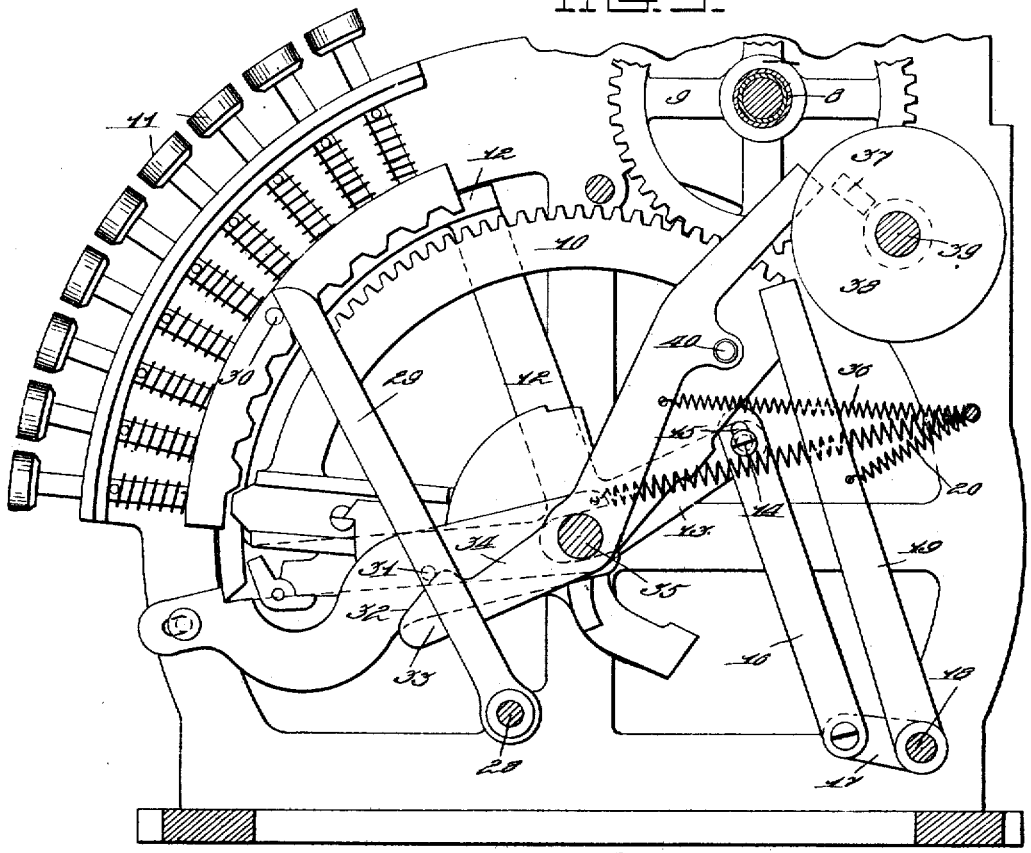

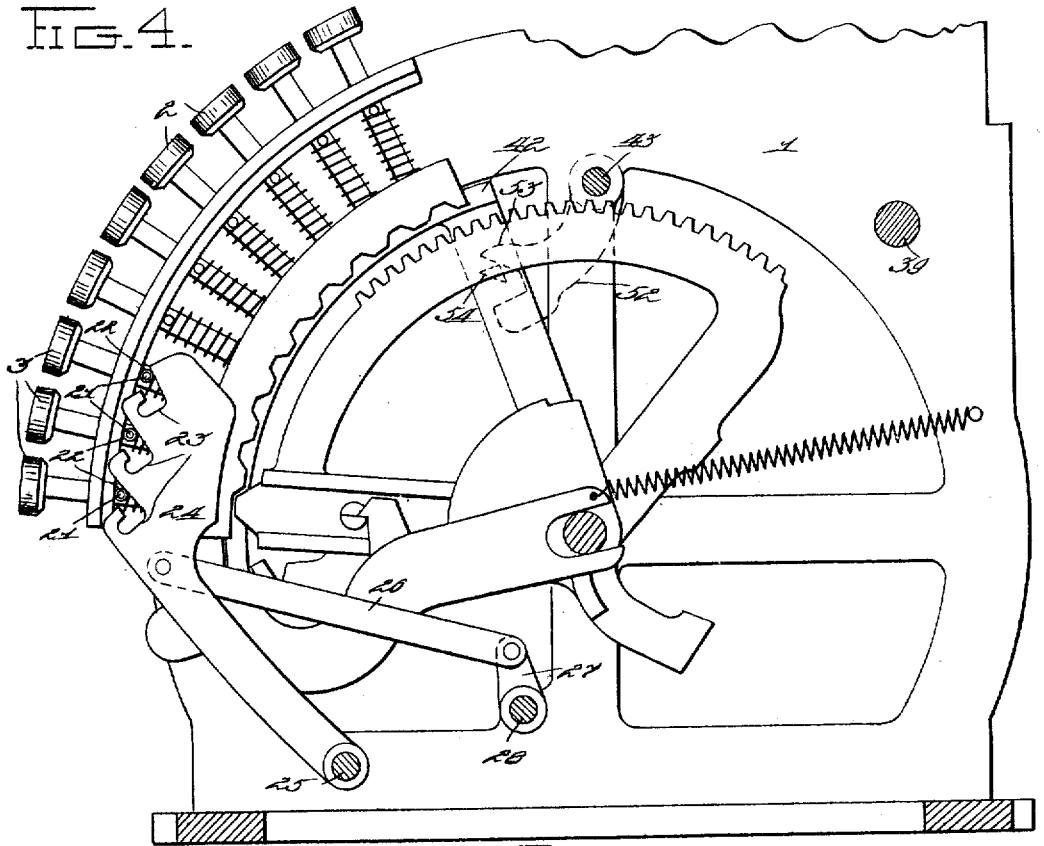

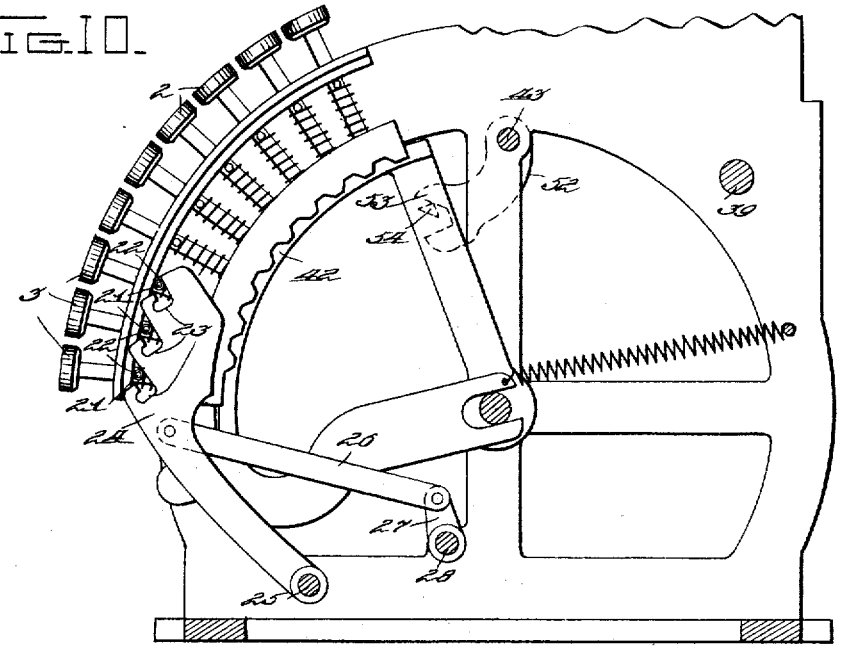

J. P. CLEAL.
CASH REGISTER.
APPLICATION FILED AUG. 6, 1903.
949,884.
Patented Feb. 22, 1910.
6 SHEETS—SHEET 6.
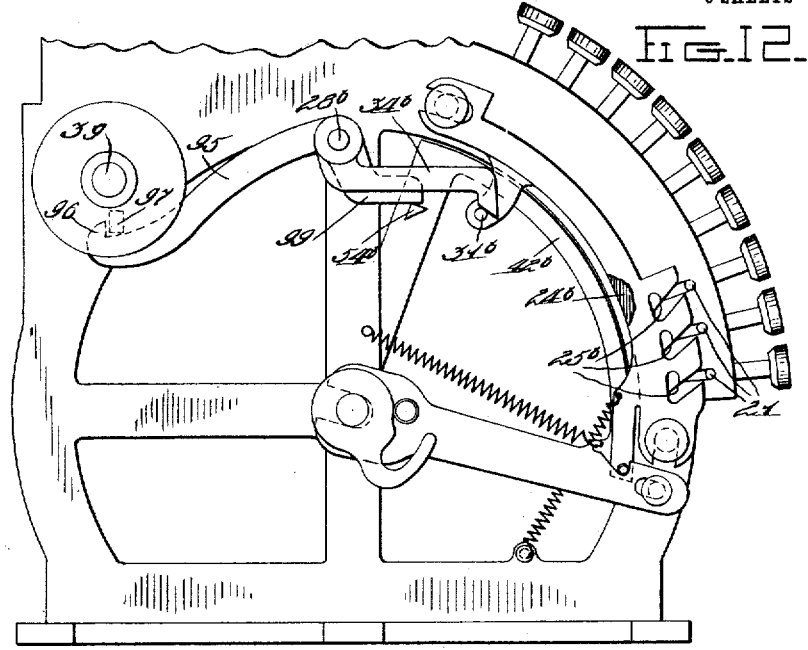
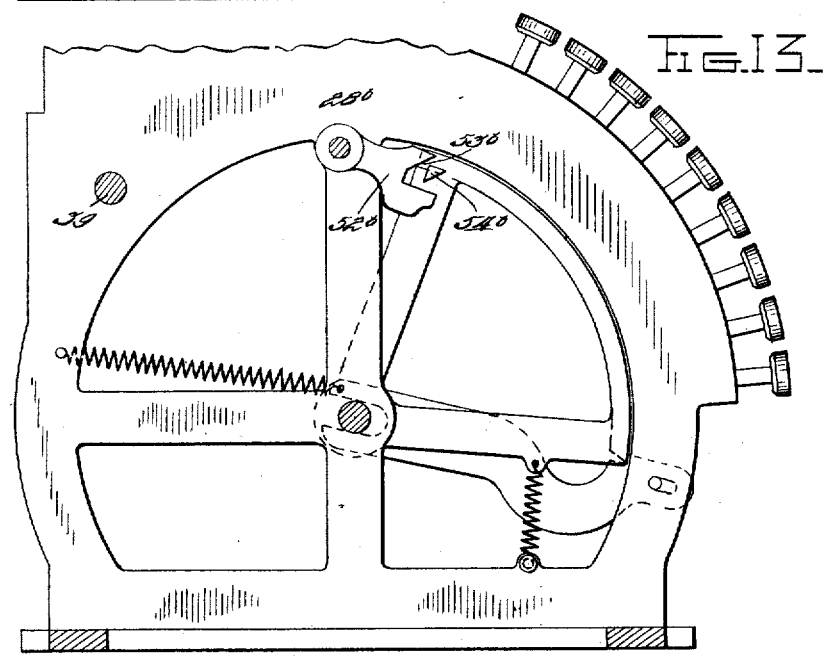
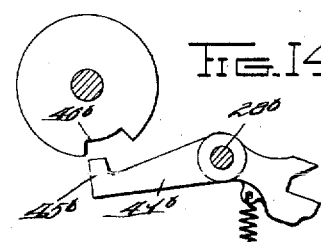

UNITED STATES PATENT OFFICE.

JOSEPH P. CLEAL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

949,884.   Specification of Letters Patent.   Patented Feb. 22, 1910.

Application filed August 6, 1903. Serial No. 168,438.

*To all whom it may concern:*

Be it known that I, JOSEPH P. CLEAL, a citizen of the United States, residing at Dayton, in the county of Montgomery and State of Ohio, have invented certain new and useful Improvements in Cash-Registers, of which I declare the following to be a full, clear, and exact description.

This invention has more particular relation to improvements in registers of the type illustrated in Patent No. 483,511 issued September 27, 1892 to Hugo Cook; Patent No. 580,378 issued April 13, 1899 on the invention of Joseph P. Cleal and Frank A. Reinhard, and Patent No. 724,378 issued March 31, 1903 on an invention of said Cleal.

One of the several objects of the invention is to provide means whereby certain designations or numbers may be printed in connection with the amount of a transaction to identify that particular transaction with some patron, customer or department.

A further object is to provide an improved printing device constructed to give a uniform pressure upon all of the types embraced therein.

A still further object is to provide for compelling the manipulation of one or more amount keys in connection with special transactions such as those commonly known in the art as "paid out," "received-on-account," and "charge."

With these and other objects in view as will appear hereinafter the invention consists in certain novel features of construction and combinations of parts, the essential elements of which are recited in the appended claims and a preferred form of embodiment whereof, with a number of modifications, is described in detail hereinafter and illustrated in the accompanying drawings wherein,—

Figure 1 represents an end elevation of a machine of the class mentioned with my improvements applied thereto; the cabinet and cash drawer being omitted for clearness. Fig. 2 represents an enlarged detail rear elevation of the printing devices, a number of the parts being omitted for clearness. Fig. 3 represents a vertical transverse section partly broken away through a machine of the class mentioned showing one form of my improved locking devices. Fig. 4 represents a similar section taken just to the right of the bank containing the special transaction keys. Fig. 5 represents an enlarged detail side elevation of the operating handle, connecting gears and the lock for the same. Fig. 6 represents an enlarged detail side elevation partly in section of the strip printing devices, the platen and the platen actuating mechanism. Fig. 7 represents an enlarged side elevation of one of the special setting levers, its type segment and alining segment. Fig. 8 represents a detail front elevation of the hinged index plate through which the setting levers project. Fig. 9 represents a detail vertical section through the same showing the latch for securing the plate in its elevated position. Figs. 10 and 11 are views similar to Figs. 4 and 3, illustrating a modification of the interlocking devices. Fig. 12 is a fragmentary end view with many parts omitted for the sake of clearness, the same illustrating another modification. Fig. 13 is a sectional view further illustrating this modification; and Fig. 14 is a detail view in the same connection.

In the accompanying drawings, 1 represents the frame of the machine, 2 the clerks' keys, 3 the special transaction keys, 4 the operating handle, 5 the regular amount printing segments, 6 the special number printing segments, and 7 the setting levers or handles for the latter.

There is shown in the drawings the particular style of machine above mentioned merely as one illustration of the application of the invention and it will be readily understood that the devices herein described can be equally well applied to other different types of machines having the same general characteristics as that shown in the present drawings. As the present improvements will be better understood however by a general description of the type of machine chosen to illustrate the application of said improvements, a description of the movements of the several parts of this particular type of machine will be given in a general way making reference to the aforesaid patents for any detailed descriptions desired.

The amount and character printing type segments 5 and 5$^a$ are mounted upon the outer ends of a series of nested sleeves 8. These sleeves at their inner ends carry gears such as that shown at 9 in Fig. 3 which mesh with a series of segmental racks such as that shown at 10 in said figure. These racks 10 are operated according to the keys which may be depressed and the proper amount and clerk's character and special character thus set up for printing. As the operation of the keys and segments above mentioned and their connections with the printing segments are well known in the art, no further description is thought to be necessary here; such description being found in the aforesaid patents if desired.

In addition to the above the present invention contemplates printing upon both the detail strip and check any desired number whereby the particular sale or transaction may be identified with some patron, customer, department or any particular class of transaction in a positive and definite manner. For this purpose there are provided the printing segments 6 which are journaled upon the outermost of the nested sleeves 8 in proximity to the regular printing segments 5 and 5ª. These segments 6 are arranged to be brought to the same printing line as the segments 5 and 5ª. The setting of the segments 6 which are mounted side by side upon the outermost sleeve 8 as shown in Fig. 2 is accomplished by means of a series of setting levers 7. These levers are connected to their respective type segments by curved open-ended rectangular frames 56 which are nested as shown in Fig. 1 so that they may pass each other to secure a reversal in the arrangement of the type segments. In other words, in operating the levers 7 from the front of the machine the operator reads from left to right while the type segments 6, in order to print backward on the strip and check carry their types in a reversed order and viewed from the front of the machine must be read from right to left for a number set up.

Each of the type segments 6 is provided with a toothed locking segment 57 by means of which the levers and the type segments are locked in their adjusted positions after the regular movements of the machine have been commenced by the operating handle 4. This locking is effected by a series of pivoted locking pawls 58 arranged to engage the segments 57 and pivotally mounted upon a short rock shaft 59 journaled in the printer frame. This rock shaft carries rigidly mounted upon it a frame 60 formed with ears 61 between which are pivoted a series of release pawls 62 having operating arms 63 which coöperate with pins 64 mounted upon the segments 57. The lower ends of the pawls 62 are formed with locking notches 65 which coöperate with locking noses 66 formed on the respective pawls 58. The pawls 62 are normally forced against the pins 64 by spiral expansion springs 67 intermediate the frame 60 and said pawls while the pawls 58 are normally forced into engagement with the teeth of the segments 57 by similar springs 68 intermediate the frame 60 and said pawls. The shaft 59 is provided near one end with an operating arm 69 which is normally drawn upward into contact with a cam 70 by a spiral retractile spring 71 which connects said arm to the main frame. The cam 70 is compounded with a gear 72 of the operating gear train of the printer so as to receive one rotation upon each operation of the crank handle. By reference to Fig. 1 it will be seen that the arm 69 has been rocked upward and its end moved into a recess 73 of the cam 70 by the spring 71. When in this position the shaft 59 is rocked rearward sufficiently to permit movement of the pawls 58; said pawls acting as alining and restraining pawls for the levers 7. When the movement of the crank handle 4 is commenced, the cam 70 forces the forward end of the arm 69 downward and thus rocks the shaft 59 and the frame 60 forward. When the frame 60 is thus rocked it contacts with the rear of the pawls 58 and locks them in engagement with the segment 57 thus preventing any movement of the levers 7 after the operation of the machine has been commenced,—the springs 68 being set in recesses formed in the frame 60 so that when the frame is moved forward as above described, these springs will be completely compressed into said recesses. As the operation of the machine is completed, the forward end of the arm 69 again enters the recess 73 and the frame 60 is rocked rearward to unlock the pawls 58. When any one of the levers 7 is moved from its normal position, its pin 64 releases its respective pawl 62 and the latter springs forward at its lower end against the nose 66 of its respective pawl 58. When the machine is now operated and the frame 60 rocked upward and forward the shoulders 65 of the released pawls 62 snap over the noses 66 of their respective pawls 58 so that when the frame 60 is rocked rearward again as before described, the pawls 58 will be entirely disengaged from the segments 57 and leave them free to return to their normal positions. This return movement is accomplished by a series of spiral retractile springs 75 which connect the respective levers 7 to the main frame whereby when said levers are otherwise unrestrained they are drawn back to their normal positions. When the levers 7 are thus automatically returned to their normal positions their pins 64 again engage the arm 63 and force the pawls 62 out of contact with the noses 66 and allow the pawls 58 to again engage and latch the segments 57 in position.

There are five of the levers 7 in the present instance and they pass through a slotted index plate 76 which is hinged as at 77 and formed with a series of slots 78 through which said levers project. The notations or characters of the scales on the plate 76 correspond with the type upon the segment 6 and in the present instance are numerals extending from zero to 9 so that any number intermediate zero and 99,999 may be set up and printed in connection with the amount of a transaction and the other special designations. As it is desirable at times to elevate the plate 76 in order to permit access to the inking pads and other parts I hinge the plate as before stated and provide the same with a notch 79 and a stop shoulder 80. A spring-pressed pawl 81 mounted upon the main frame is arranged to project into the notch 79 when the plate is in its normal position. When the plate is elevated the pawl 81 passes upward against the stop shoulder 80 and holds the plate in its elevated position until it is forcibly depressed.

The reciprocating platen 85 is slidably mounted in the main frame substantially as shown and described in the aforesaid Cook, and Cleal and Reinhard patents and is reciprocated by a box cam 85$^a$. As this box cam is only connected to one end of the slide 85$^b$ carrying the platen and as this latter is of some little width, it becomes necessary to provide auxiliary means for simultaneously raising the opposite end of the platen to secure a uniform pressure across the entire platen. This means comprises a cam 86 (Fig. 6) mounted upon the rotation shaft 39 and engaging the rear end of a lever 88 pivoted intermediate its ends on the printer frame and provided at the opposite end with an inturned ear carrying an adjustable pressure bolt 89 which engages the underside of a lever 90 which is mounted on the printer frame adjacent to and concentric with the lever 88. The forward end of the lever 90 is slotted as at 91 to embrace the inner end of a rod 92 around which rotates an impression roller 93; the outer end of the rod 92 being supported in the platen frame 85. Pivoted to the frame 85 is a spring drawn arm 94 the rearward end of which encircles the rod 92 to keep it in the position to which it is adjusted by bolt 89. The formation of the cam 86 is such that the lever 88 is given two movements during each operation of the machine to coöperate with the box cam in giving the impression roller two printing impulses in each cycle of operation. This construction provides for insuring an even impression throughout the length of the roller and the full width of the line of type, notwithstanding the increase in the latter by the addition of the specially set type segments.

Each of the banks of amount keys 11 coöperates with a pivoted segmental detent 12 in such a manner that if a key is operated in any bank its corresponding detent is elevated substantially as shown in said patents. For the purpose of the present invention each of these detents 12 is provided with a rearwardly projecting arm 13 carrying a headed screw 14 which projects through an elongated slot 15 formed in a link 16. The lower end of each link is connected to a crank arm 17 and these arms are in turn mounted rigidly upon a transverse rock shaft 18. This shaft is provided near one end as shown in Fig. 3 with a vertical locking or tappet lever 19 which is normally drawn rearward by a coil spring 20 which connects the same to the main frame. This normal position of the lever 19 holds all of the links 16 normally elevated with the pins 14 contacting with the lower walls of the slots 15. When any one of the detents 12 is elevated its corresponding arm 13 is forced downward and as the pin 14 carried by this arm is contacting with the lower wall of the slot 15 of its respective link 16, the latter is forced downward thus rocking the shaft 18. This rocking of the shaft 18 draws all of the link bars 16 downward but the slots 15 in said bars are of such length that this downward movement will not be sufficient to in any wise disturb the remaining detents 12 and these latter will only be elevated by the depression of some one of the keys in the bank to which they belong. During the normal operation of the machine for a cash transaction the connections above described subserve no useful purpose but should it be desired to register, indicate and print a special transaction, such, for instance as "paid out," "charge," or "received-on-account," the said parts coöperate to compel the operation of amount keys in connection with the special transaction keys before the machine is unlocked for operation.

By reference to Fig. 4 it will be seen that each of the special keys 3 carries a laterally projecting pin 21 provided with an anti-friction roller 22. These pins project into inclined bayonet slots 23 formed in the upper end of a lever 24 which is journaled upon a transverse rock shaft 25. When any one of the keys 3 is depressed its particular roller 22 will contact with the inclined wall of its respective bayonet slot 23 and will thus rock the lever 24 upward and rearward. The lever 24 is subsequently given a further movement to effect the locking of the depressed key but as the present invention has to do only with this initial movement of the lever, no further description in this direction will be given in this specification. The lever 24 is connected by a link 26 to a crank arm 27 fast upon a transverse rock shaft 28. This shaft 28 as best shown in Fig. 3 is provided with a throwout arm 29 for throwing out the counter in the manner described in the beforementioned Cleal patent No. 724,378. This arm normally rests against a stop pin 30 mounted upon one end of the stationary frame-pieces and is provided with a laterally projecting pin 31. This pin as shown in Fig. 3 normally engages the inclined edge 32 of a nose 33 formed on a lever 34 which is pivotally mounted on the main transverse supporting shaft 35. The nose 33 is normally held in contact with the pin 31 by a coil spring 36 which connects the said lever to the frame. A stop lug or projection 37 is mounted upon a disk 38 fast to the main rotation shaft 39 and the upper rear end of the lever 34 projects in proximity to the said lug but is normally held clear of the same as shown in Fig. 3. When in this position the shaft 39 is free to operate but should any one of the three special keys be operated as before described, the lever 29 will be moved rearward sufficiently to disengage the pin 31 from the nose 33 and thus allow the spring 36 to draw the upper end of the lever 34 rearward into the path of the projection 37. This operation locks the machine and prevents any movement of the operating handle 4. If after one of the special keys has been operated, one or more amount keys should be pressed in the lever 19 will be rocked forward as described and contacting with a stud 40 mounted on the lever 34 will force the upper end of the same forward out of the path of the lug 37 and unlock the machine.

The office of the above described devices is to compel the operation of some amount key in connection with the operation of any one of the three special keys. The operating handle 4 is normally locked by the regular pivoted latch pawl 41 best shown in Fig. 5. This pawl is operated by the detent 42 of the special clerk's key bank. The locking pawl 41 is mounted upon a transverse rock shaft 43 and is normally drawn upward at its rear end into locking position by a coil spring 44 which connects the forward end of the pawl to the main frame. A locking nose 45 of the pawl normally projects into a locking recess 46 formed in a disk 47 fast to a gear 48 which is journaled upon the main frame. The gear 48 meshes with a gear 49 fast to the rotary shaft 39 and also with a large intermediate gear 50 in mesh with a pinion 51 fast to the operating handle 4. The opposite end of the shaft 43 is provided with a downwardly and forwardly projecting trip arm 52 (see Fig. 4) having an inclined nose 53 which is acted upon by a triangular lug 54 mounted on the aforesaid detent 42. It results from the above construction that when the detent 42 is elevated by the operation of any one of the clerk's keys 2 the shaft 43 is rocked rearward thus moving the nose 45 out of the notch 46 sufficiently to free the disk 47 and permit the operation of the machine as far as this particular latch is concerned.

It will be seen from the above description that for an ordinary cash transaction the machine is fully unlocked by simply depressing one of the clerk's keys 2 while for a transaction of a special nature such as "paid out," "received-on account," or "charge," the machine is not unlocked until a clerk's key, and one or more amount keys have been operated, after one of the special keys has been operated. Of course if an amount key is first operated and then the special transaction key, the locking lever 34 does not move into locking position at all for the depression of the amount key moves the arm 19 up to the roller 40 and when the pin 31 is subsequently moved beyond the nose 32, said lever is held by said arm 19.

Various constructions may be employed differing more or less from that shown in the accompanying drawings for the purpose of compelling an operation of the amount keys in connection with a special transaction. For example, the lever 34 instead of being thrown to its unlocking position (after movement into locking position by the manipulation of a special key) by the operation of a lever such as 19, may be shifted by an arm 19$^a$ (see Figs. 10 and 11) depending from a shaft 18$^a$ at the front of the machine just above the banks of keys which arm will be provided with a roller-equipped pin 40$^a$ at its lower end for contact with the lower part of said lever 34. On the shaft there will be fixed a set of arms 16$^a$ one for each bank of amount keys and each segmental detent 12 will be provided with a laterally projecting pin 14$^a$ to act against one of said arms so that when any amount key is pressed in the shaft will be turned and the first mentioned depending arm moved back against a lower beveled portion of the lever 34. Another construction for accomplishing this same object is shown in Figs. 12–14, and comprises a lock 41$^b$ similar to the one designated 41 in Fig. 5 which lock however will be normally disengaged from its notch 46$^b$. In this case the pins 21 of the special keys will operate in inclined slots 25$^b$ of a sliding segmental plate 24$^b$ which will be provided with a pin 31$^b$ normally supporting an arm 34$^b$ which is fast upon the same shaft 28$^b$ as the lock 41$^b$, the latter being held out of engagement with the notch 46$^b$ by reason of this engagement between the pin on the sliding segmental plate and the arm. When the said plate is moved upwardly by the pushing in of a special key the said pin will be shifted so that the same arm can drop with the result of moving the nose 45$^b$ into the notch 46$^b$. Each of the segmental amount key detents will be provided with a triangular pin 54ᵇ similar to the one indicated at 54 in Fig. 4 for co-operating with arms 52ᵇ mounted upon the shaft 28ᵇ to which the locking lever 41ᵇ is fastened, these arms having the noses 53ᵇ. The elevation of any one of the segmental amount key detents after the operation of one of the special keys will thus have the effect of moving the lock 41ᵇ back to its normal position out of engagement with the notch 46ᵇ. In this modified construction this lock 41ᵇ will no longer constitute the main lock of the machine under control of the initial or clerks' keys but a separate lock will be provided in the form of a lever 95 having a nose 96 normally engaging behind a shoulder 97 on the rotation shaft 39 of the machine, this lever having a forwardly projecting portion 99 for coöperating with a triangular shaped pin 54ᵇ on the segmental detent 42ᵇ which is moved by the clerks' keys.

It is evident that the invention is susceptible of embodiment in various other forms than as here shown and described, and it is to be understood therefore that in claims to follow essential elements of the invention will be recited without limitations to details of construction.

Having thus described my invention, what I claim is,—

1. In a machine of the character described, the combination with an operating mechanism and manipulative amount determining devices controlling the performances of said operating mechanism; of an attachment for producing a printed record of transactions, the same including auxiliary type carriers with individual manipulating means for setting up various combinations to be printed with the transaction indicia for identification purposes, together with means for automatically restoring the said type carriers to initial positions after the printing operation is concluded.

2. In a machine of the character described, the combination with an operating mechanism and manipulative amount determining devices controlling the performances of said operating mechanism; of an attachment for producing a printed record of transactions, the same including auxiliary type carriers with individual manipulating means for setting up various combinations to be printed with the transaction indicia for identification purposes, together with means for locking said type carriers in set positions during the printing and for automatically unlocking them after the printing is concluded and before the completion of a cycle of operation of the machine, and means for automatically restoring the said type carriers to initial positions, substantially as described.

3. In a machine of the character described, the combination with an operating mechanism and manipulative amount determining devices controlling the performances of said operating mechanism; of an attachment for producing a printed record of transactions, the same including a set of special type carriers with adjusting handles for setting up the various combinations to be printed with the transaction indicia for identification purposes, the handles and type carriers being reversely connected from right to left by means of nested straps not contacting with each other, substantially as and for the purpose described.

4. In a machine of the character described, the combination with an operating mechanism and manipulative amount determining devices controlling the performances of said operating mechanism; of an attachment for producing a printed record of transactions, the same including special type segments, setting levers therefor, and nested frames connecting the said segments with their respective levers and not contacting with each other, substantially as and for the purpose described.

5. In a machine of the character described, the combination with an operating mechanism and manipulative amount determining devices controlling the performances of said operating mechanism; of an attachment for producing a printed record of transactions, the same including special type segments carrying locking segments, setting levers for said type segments, pawls engaging said locking segments, means for locking said pawls in such engagement during the printing operation, and means for automatically restoring the type segments to normal positions.

6. In a machine of the character described, the combination with an operating mechanism and manipulative amount determining devices controlling the performances of said operating mechanism; of an attachment for producing a printed record of transactions, the same including special type carriers spring drawn to normal positions; together with means for automatically locking said carriers in set positions by the operating mechanism of the machine, and for releasing the same after the printing has concluded.

7. In a machine of the character described, the combination with an operating mechanism and manipulative amount determining devices controlling the performances of said operating mechanism; of an attachment for producing a printed record of transactions, the same including special type segments spring drawn to normal positions and carrying locking segments, pawls engaging the same, and means for locking said pawls in such engagement when the type segments have been set and the operation of the machine commenced, with provisions for disengaging said pawls from the locking segments before the conclusion of an operation of the machine.

8. In a machine of the character described, the combination with an operating mechanism and manipulative amount determining devices controlling the performances of said operating mechanism; of an attachment for producing a printed record of transactions, the same including special type segments spring drawn to normal positions and carrying locking segments, pawls engaging the same, a frame embracing said pawls for locking the same in engagement with their segments, pawls carried by said frame and designed to interlock with the first mentioned pawls when said frame moves to locking position and disengage said pawls from the locking segments when the frame is retracted; together with cam devices for actuating the said locking frame, and provisions for disengaging the release pawls from the segment pawls, substantially as described.

9. In a machine of the character described, the combination with an operating mechanism and different sets of manipulating devices for determining the amount and the character of transactions; of a normally displaced lock for the operating mechanism, means for rendering said lock effective upon manipulation of a member of one set of the manipulating devices, and means for again disabling the lock upon manipulation of a member of the other set of such devices, substantially as and for the purpose described.

10. In a machine of the character described, the combination with an operating mechanism and different sets of manipulating devices for determining the amount and the character of the transactions; of a lock for the machine impelled toward locking position, means under control of one of said sets of manipulating devices for normally restraining said lock, and means under control of the other set of manipulating devices for restoring the lock to unlocking position after it has been permitted to assume a locking position, substantially as and for the purpose described.

11. In a machine of the character described, the combination with an operating mechanism and amount and special transaction keys; of a lock for the machine impelled toward locking position, means under control of the special keys for restraining said lock, and means under control of the amount keys for restoring the lock to unlocking position after it has been permitted to assume a locking position, substantially as and for the purpose described.

12. In a machine of the character described, the combination with an operating mechanism and amount and special transaction keys with their detents; of a lock for the machine, a movable support for said lock connected with the special key detent, and a tappet connected with the amount key detent and designed to restore the lock to unlocking position after displacement through removal of the said support.

13. In a machine of the character described, the combination with an operating mechanism and amount and special transaction keys; of a locking lever for the machine spring actuated in a locking direction, a special key detent normally restraining said lever from assuming a locking position, amount key detents, and devices operated thereby to return the locking lever to normal position, substantially as and for the purpose described.

14. In a machine of the character described, the combination with the printing couple, and a regular means for advancing one member of the couple toward the other, of an auxiliary means for advancing one toward the other acting upon the end opposite that to which the regular means is applied, whereby to produce uniform impressions, with provisions for adjusting said auxiliary means.

15. In a machine of the character described, the combination with the printing couple, and a regular means for advancing one member of the couple toward the other, of an auxiliary means for advancing one toward the other acting upon the end opposite that to which the regular means is applied, said auxiliary means comprising a two part lever with provisions for adjustment, and a cam for vibrating said lever, substantially as described.

16. In a cash register, the combination with an operating mechanism, and a locking device therefor, of two different transaction determining keys, one of which disables said locking device and the other renders it effective in the event of the conjoint operation of both keys.

17. In a cash register, the combination with an operating shaft for the register, and a locking device therefor comprising a pivoted arm with spring means normally tending to move said arm to locking position, of two different manipulative devices, connections under control of one of said devices normally preventing movement of said locking arm to locking position, and devices actuated by the other manipulative device for withdrawing said locking arm from locking position.

18. In a cash register, the combination with an operating mechanism and a locking device therefor, of two manipulative devices and connections from each for holding said locking device in releasing position, one connection so operating until the first manipulative device is operated and the other so operating after the second manipulative device is operated.

19. In a cash register, the combination with an operating mechanism and a locking device therefor, of a manipulative device and connections holding said locking device in releasing position until the manipulative device is operated and a second manipulative device and connections which when operated hold said locking device in releasing position irrespective of the operation of said first manipulative device.

20. In a cash accounting device, the combination with differentially adjustable members, accounting devices controlled thereby, means for frictionally holding the adjustable members in their adjusted positions, an operating mechanism and means controlled thereby for positively holding the frictional means in engagement with the adjustable members so as to prevent displacement thereof during a part of the movement of the operating mechanism and then positively withdrawing the frictional means from out of engagement to permit the automatic return to normal position of the adjustable members.

21. In a cash register, the combination with an operating device for the register, and a pivoted arm for locking said operating device, spring means tending to move said locking arm to locking position, a series of keys, devices controlled by said keys normally preventing movement of said locking arm to locking position, a second series of keys and devices controlled thereby for positively returning said locking arm to releasing position.

In testimony whereof I affix my signature, in the presence of two witnesses.

JOSEPH P. CLEAL.

Witnesses:
LEWIS D. BAKER,
WM. O. HENDERSON.